United States Patent [19]

Quinn et al.

[11] Patent Number: 5,303,571
[45] Date of Patent: Apr. 19, 1994

[54] METHOD OF PRODUCING A ONE-PIECE BAND CLAMP

[75] Inventors: David N. Quinn, Lakewood; Glendon R. Kessler, Westminster; Robert G. Hayden, Commerce City, all of Colo.

[73] Assignee: Band-It-Idex, Inc., Denver, Colo.

[21] Appl. No.: 4,642

[22] Filed: Jan. 12, 1993

Related U.S. Application Data

[63] Continuation of Ser. No. 755,872, Sep. 6, 1991, abandoned.

[51] Int. Cl.⁵ .................... B21D 53/36; B21D 28/32
[52] U.S. Cl. ........................ 72/336; 72/335; 72/339; 72/379.2; 24/20 R; 24/16 R; 24/17 R
[58] Field of Search ............... 72/335, 336, 338, 339, 72/329, 330, 327, 333, 334, 331, 479, 476, 379.2, 392; 140/72; 29/3; 24/17 AP, 17 R, 16 R, 16 PB, 30.5 R, 20 R

[56] References Cited

U.S. PATENT DOCUMENTS

| | | | |
|---|---|---|---|
| 157,032 | 11/1874 | Smith . | |
| 356,083 | 1/1887 | Schrader et al. . | |
| 1,264,819 | 4/1918 | Lavin | 24/16 PB |
| 1,440,998 | 1/1923 | Kadel | 72/379.2 |
| 1,548,756 | 8/1925 | Scott | 72/392 |
| 1,826,027 | 10/1931 | Schaeffer | 72/392 |
| 1,829,613 | 10/1931 | Sato | 24/17 AP |
| 1,839,530 | 1/1932 | Braun | 72/335 |
| 2,041,860 | 5/1936 | Ragan | 140/72 |
| 2,652,620 | 9/1953 | Sutowski | 72/335 |
| 2,848,805 | 8/1958 | Brink | 72/335 |
| 3,102,311 | 9/1963 | Martin et al. | 24/16 |
| 3,660,869 | 5/1972 | Caveney et al. | 24/16 PB |
| 3,747,163 | 7/1973 | Serino | 24/16 PB |
| 4,272,870 | 6/1981 | McCormick | 24/16 PB |
| 4,507,828 | 4/1985 | Furutsu | 24/16 PB |
| 4,541,146 | 9/1985 | Giannone | 24/20 R |
| 4,646,393 | 3/1987 | Young | 24/20 R |
| 4,751,769 | 6/1988 | Young | 24/20 R |
| 4,896,402 | 1/1990 | Jansen et al. | 24/20 R |

FOREIGN PATENT DOCUMENTS

| | | | |
|---|---|---|---|
| 401523 | 9/1909 | France | 24/17 AP |
| 571978 | 9/1945 | United Kingdom . | |
| 1032303 | 6/1966 | United Kingdom . | |

OTHER PUBLICATIONS

1991 Band-It Catalog-p. 17-Cat. No. AE202.

*Primary Examiner*—Daniel C. Crane
*Attorney, Agent, or Firm*—Sheridan Ross & McIntosh

[57] ABSTRACT

The present invention involves a method for forming a one-piece band clamp. The band clamp is made by severing band material to a proper width, forming the band material to a desired length, removing a portion of the band to form a void in one end of the band material, inserting a deformation device into the void, and deforming the band material adjacent to the void to form a slot in the band material sufficiently wide to allow insertion of the band body.

8 Claims, 5 Drawing Sheets

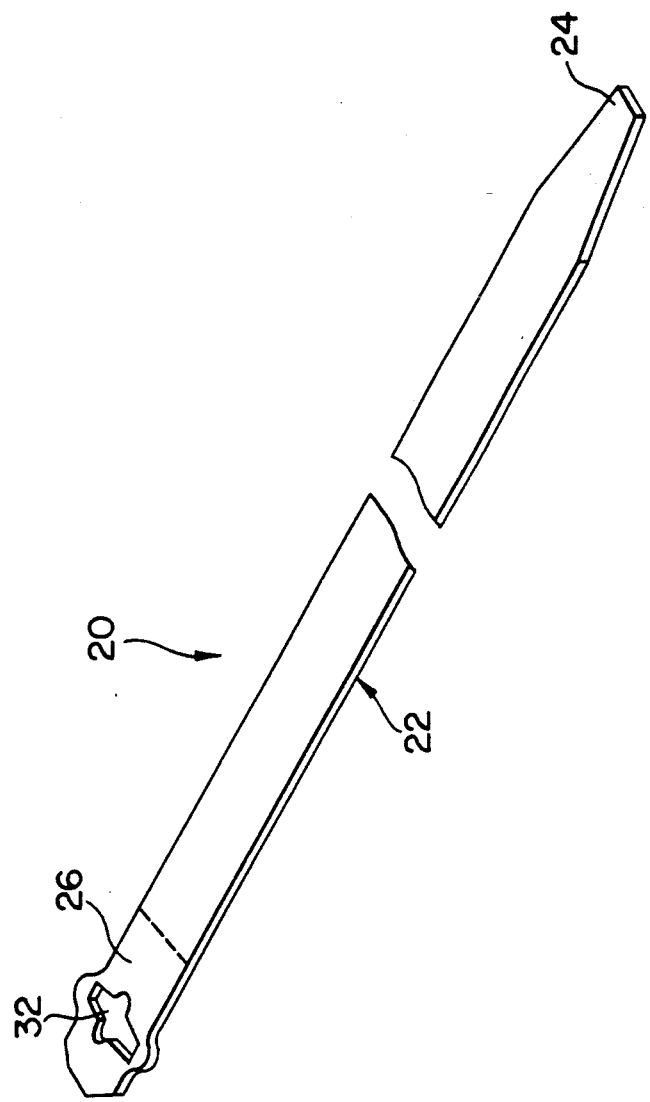

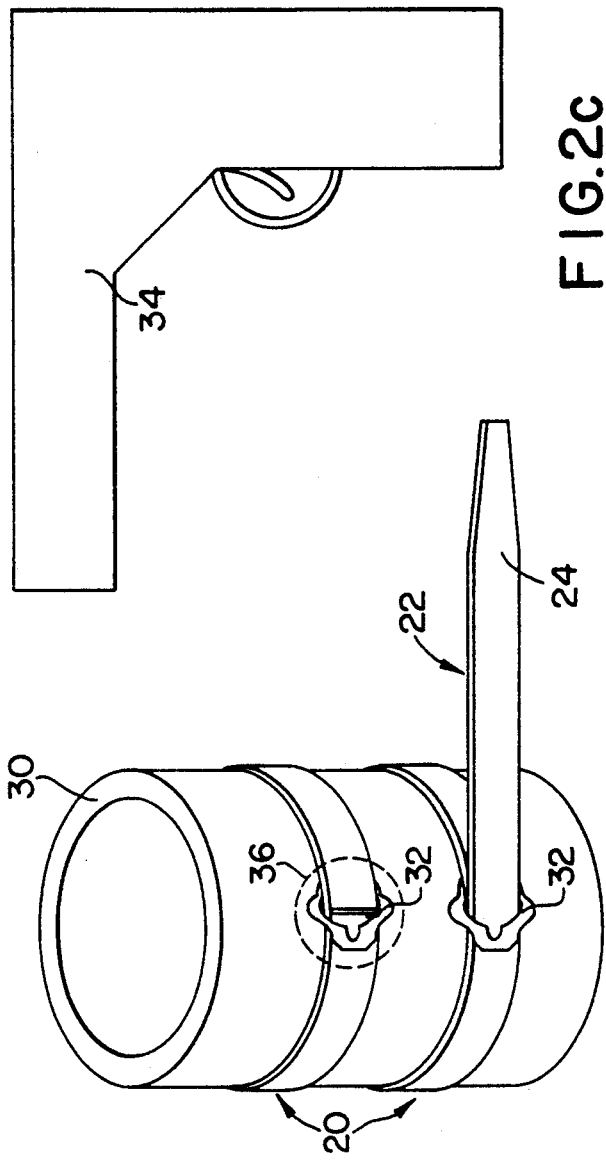
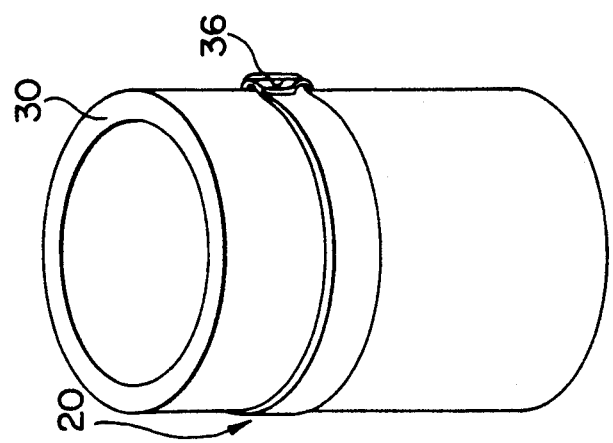

METHOD OF PRODUCING A ONE-PIECE BAND CLAMP

This is a continuation of co-pending application Ser. No. 07/755,872, filed on Sep. 6, 1991, now abandoned.

FIELD OF THE INVENTION

The present invention relates to a method for forming a band clamp, and more particularly to a method for producing a one-piece, low profile, band clamp.

BACKGROUND OF THE INVENTION

One-piece fastening or clamping devices are well known and are used for a variety of purposes. In one application, band clamps are used to secure electric shielding or insulation about electric wire. In another application, band clamps are used to secure pipe or other couplings to hose connections. Generally, however, fastening and clamping devices, such as band clamps, are used to reduce the size of any gap between the object constrained and the band adjacent thereto. Consequently, it can be appreciated that a one-piece band clamp is useful in any number of situations since it is not necessary to carry separate band sections and buckles and a tool to assemble them.

One type of commercially available one-piece planar cable-tie, made by the assignee of the present invention, includes a buckle section having a width greater than the remaining band body which is insertable therein. The cable-tie is produced by a method, such as stamping or die cutting, that cannot fully utilize the band material. Specifically, due to the extra width of the buckle section as compared to the band body, material between adjacent cable-ties is necessarily wasted during the manufacturing process.

A clamping device that is useful for numerous clamping jobs is disclosed in U.S. Pat. No. 4,896,402 to Jansen et al., issued Jan. 30, 1990 and entitled "Cable Tie." The device is a one-piece cable tie that utilizes a multi-planar buckle section through which the free end of the band is inserted. Jansen et al. also discloses that the cable tie is preferably made by a machine process in which the clamps are alternately formed on opposing sides of a sheet of metal material. The machine process must utilize this procedure because the buckle section is significantly wider than the overall band. Consequently, this fabricating process wastes material and adds a step to the manufacturing process which reduces efficiency. Moreover, the resulting clamp, when properly secured, results in a relatively high-profile clamp buckle and band interface.

Another one-piece clamping device is disclosed in U.S. Pat. No. 4,896,402 to Young, issued Jun. 21, 1988 and entitled "Band Clamp with Formable Buckle." The device comprises a multi-planar buckle section and a planar band body section. The device is fabricated by stamping a buckle section with "wings" perpendicular to the band's body section. The wings are then folded toward each other in abutting relation to form an opening. Finally, the wings are welded or braised together at the abutting ends to form the continuous loop of the buckle. This process not only produces a high-profile clamp buckle and band interface, but the initial stamping process wastes material and the bending and welding processes are both expensive and time consuming.

In U.S. Pat. No. 4,646,393, also to Young, issued Mar. 3, 1987 and entitled "Clamping Band for Electromagnetic Shielding Band Cable Connector," a one-piece clamping device for use in constraining electromagnetic shielding is disclosed. This device also comprises a multi-planar buckle section and a planar band section. The buckle includes a pair of abutting wings that are welded together after being folded to create a single, longitudinally extending opening.

Another commercially available one-piece cable tie, that has been made by the assignee of the present invention, includes a buckle having a raised section with slots formed on opposing sides of the raised section. The raised section, forming a high-profile buckle, is formed by punching the buckle in two opposing directions. However, the buckle side edges are flat and not raised.

A further integral band clamp is disclosed in U.S. Pat. No. 4,541,146 to Giannone, issued Sep. 17, 1985 and entitled "Clinching Clamp Device and Method of Attachment." The band comprises a multi-planar buckle which utilizes an "anchor" section to securely fasten the band to the encircled objects. The buckle and anchor are formed by taking an elongated strip of readily bendable metal and making a series of at least two convolutions of the band which have been bent at right angles to the device. The convolutions are wound in such a manner as to define a through-going passageway. This process of manufacture is inefficient because the step of twisting the band to produce a through-going passageway is expensive and time-consuming.

Other one-piece clamps are illustrated in U.S. Pat. No. 356,083 to Schrader, et al., issued Jan. 11, 1887 and entitled "Clamp for Hose Couplings" and U.S. Pat. No. 157,032 to Smith, issued Nov. 17, 1874 and entitled "Bail-Ties." Schrader, et al. describes a hose clamp having a number of projections that can be folded to provide a buckle. In the Smith patent, wings integrally formed with the band are bent over to engage portions of the band. The manufacture of both these devices necessarily requires the utilization of either wasteful metal stamping or expensive bending and welding techniques.

A one-piece cable tie is also described in U.S. Pat. No. 3,660,869 to Caveney, et al., issued May 9, 1972 and entitled "One-Piece Cable Tie." This tie is characterized by the use of a row of teeth disposed on one longitudinal surface of the strap. The patent also describes a plastic molding process for making the cable ties. Similar devices are disclosed in U.S. Pat. No. 4,272,870 to McCormick, issued Jun. 16, 1981 and entitled "Synthetic Plastics Tie Member" and U.S. Pat. No. 4,507,828 to Furutsu, issued Apr. 2, 1985 and entitled "Bundling Belt Device." The cable ties of McCormick and Furutsu are also manufactured using plastic molding techniques.

Although one-piece clamps or cable ties and the process of their manufacture are relatively well known, there is a need for a method for manufacturing a one-piece clamping device having a low profile buckle, that can be produced quickly, inexpensively and without waste of material.

SUMMARY OF THE INVENTION

The present invention involves a method for forming a planar band clamp with a strap or band section and an integral buckle section formed at one end of the band section. Further, the present band clamp, when properly installed, has a relatively low-profile in relation to the objects being constrained, which can be useful in limited space situations and in substantially preventing the unwanted creation of a gap between the clamp and the external object. The present process provides numerous advantages, including the ability to produce a one-piece clamp in a more efficient and less costly manner than has previously been available. Specifically, the present method creates a one-piece clamping device that involves relatively few, uncomplicated steps while substantially reducing material waste.

In one embodiment of the present process, a roll of material is provided having a width and length at least equal to the band section of the one-piece band clamp. The material's thickness is determined by the specific specifications of each individual band clamp. Generally, the material is fed through a device that cuts the material to the desired individual band width. The individual band width material is then gathered and wound into a second roll.

Next, the band material on the second roll is fed through a finishing apparatus. The finishing apparatus forms the band material to the desired band length. Further, in one embodiment of the invention, the free end of the band's body is formed to a taper. The tapered section of the band is used to facilitate engagement of the band body with the band buckle, generally making utilization of the band clamp easier. Next, a portion of the band is removed to form a void in the end of the band opposite the free end, to form the buckle section. The void can be produced by any number of methods, the exact method of creating the void is unimportant to the present invention, and may comprise stamping, die cutting, etc. The void must be large enough to allow engagement of a material deformation or stretching device.

Third, the band is positioned so that the material deformation device can be inserted into the void. Once inserted, the device deforms the band material adjacent the void to form a slot. The slot must be at least slightly wider than the band width to facilitate proper engagement of the free end with the buckle. In another embodiment, the buckle section can be pressed to remove any previously created nonplanar deformities. It should also be understood that it is unimportant whether the slot is formed or cutting the band to proper length is conducted first.

In view of the foregoing summary, it is readily seen that important objectives have been achieved by the present invention. A method of producing a planar one-piece clamping device is provided that can be made by means of a relatively inexpensive manufacturing process that creates less waste. Consequently, when the band clamp is made of relatively expensive material, the cost of making the band clamp is maintained at a commercially acceptable level.

Additional advantages of the present invention will become readily apparent from the following discussion when taken in conjunction with the accompanying drawings.

BRIEF DESCRIPTION OF THE DRAWINGS

For a more complete understanding of the present invention, reference is now made to the Detailed Description taken in conjunction with the accompanying Drawings, in which:

FIG. 1 is a perspective view of a one-piece band clamp formed in accordance with the present invention;

FIGS. 2A and 2B illustrate attachment of the one-piece band clamp and shows a fully-attached one-piece band clamp about an object be constrained;

FIG. 2C shows a banding tool for use in tightening a band clamp about an object;

DETAILED DESCRIPTION OF THE INVENTION

Figure 3A:
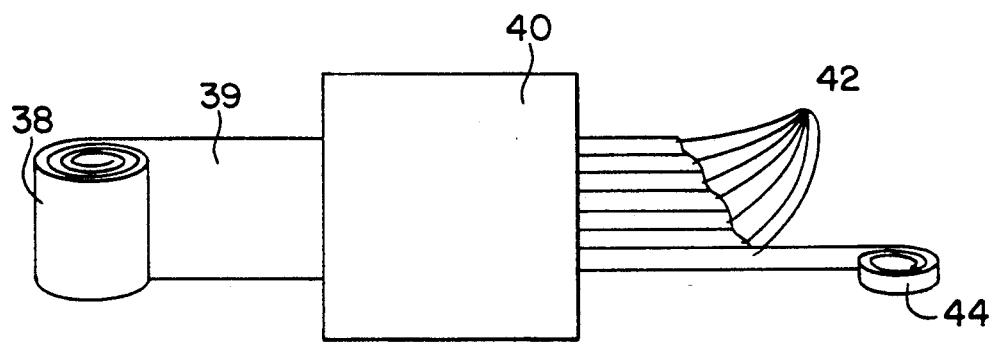
FIG. 3A illustrates a first step of severing the band material to the required band width and individually spooling each length of severed material.

The present invention is useful in forming a one-piece band clamp utilizing a process which is cost effective, efficient and produces little material waste. The invention is an improved method for forming the band clamp 20 of FIG. 1. The band clamp 20 includes a band or strap section 22 having a free end 24 and a buckle section 26 distal thereto. The buckle section 26 is designated using a dotted line in FIGS. 1, 4 and 5 although it should be understood that the band 22 is integral with the buckle section 26 and the dotted line merely provides a convenient reference for differentiating the band 22 from the buckle section 26. Further, the band or strap section 22 is of any predetermined length sufficient to wrap about the object being constrained.

With reference to FIG. 2, the band clamp 20 can be secured about an object to be constrained 30, such as a representative tube, by inserting the free end 24 through a slot 32 in the buckle section 26. Next, the free end 24 is inserted into a banding tool 34. The tool 34 tightens the band clamp 20 to a desired pressure about the object to be constrained 30. The tool 34 then securely locks the band clamp 20 and any excess band section 22 may be removed, leaving a low-profile fully locked buckle 36.

Figure 3B:
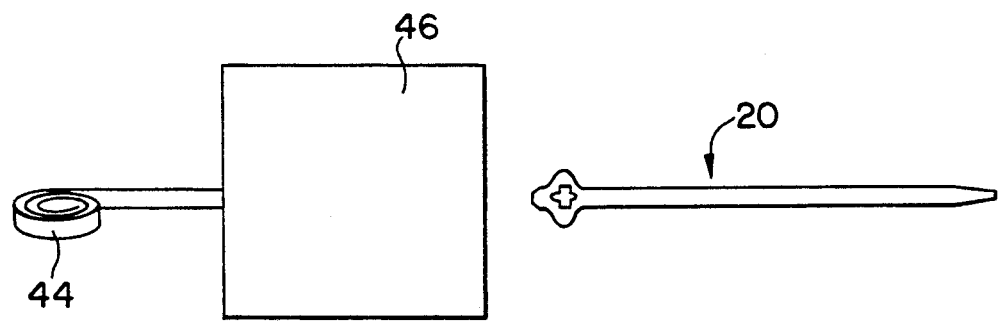
FIG. 3B illustrates generally a second step of cutting, punching and stretching the spooled band material to form the one-piece band clamp.

The method of forming the band clamp 20 is illustrated in FIGS. 3, 4 and 5. FIG. 3A shows a spooled roll 38 of band material 39 being fed into a material severing device 40. The band material 39 is severed into the proper width of the band section 22 forming strips 42. The strips 42 are then wound into second spool rolls 44 (only one of which is shown) in anticipation of further processing. Next, the strips 42, previously wound into the rolls 44, are fed into the finishing apparatus 46 (see FIG. 3B).

Figure 4B:
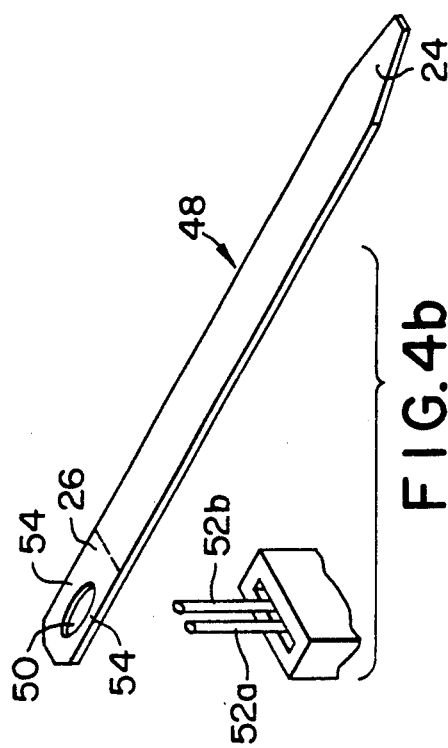
FIGS. 4A, 4B, 4C and 4D illustrate a band after various steps in accordance with the present invention.
Figure 4D:
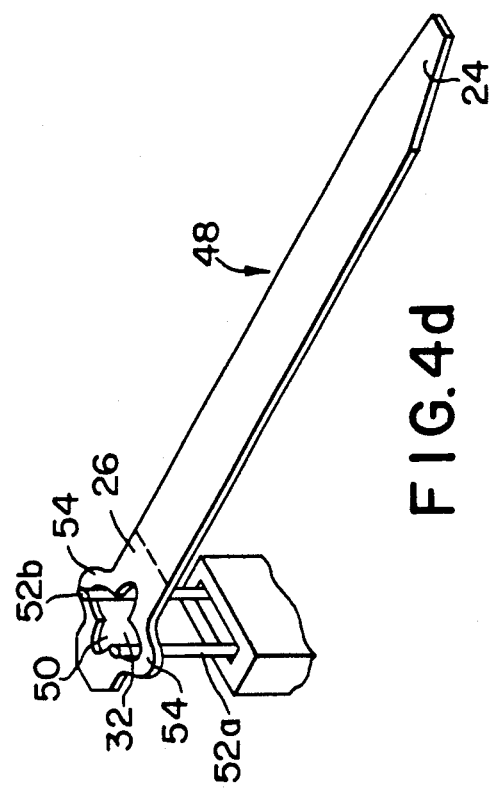
Figure 4A:
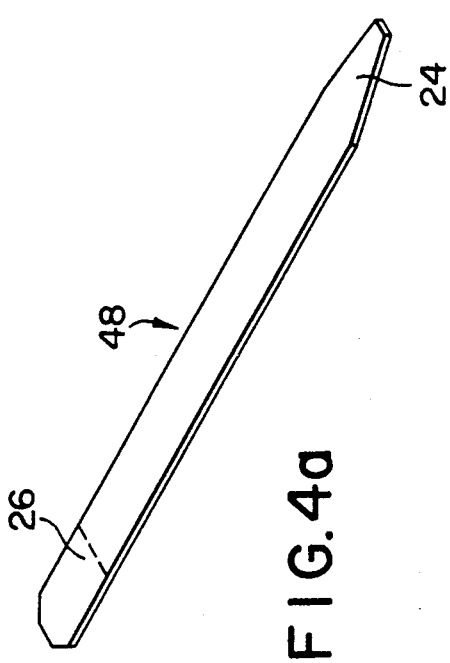
Figure 5B:
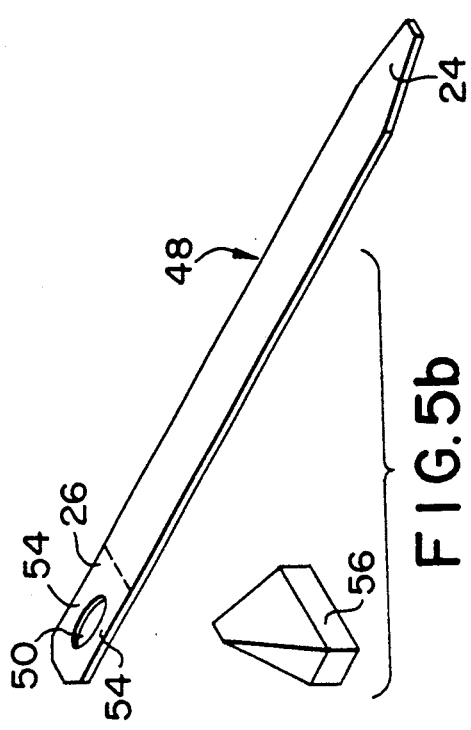
FIGS. 5A, 5B, 5C and 5D illustrate a band after various steps in accordance with an alternative process of the present invention.
Figure 5D:
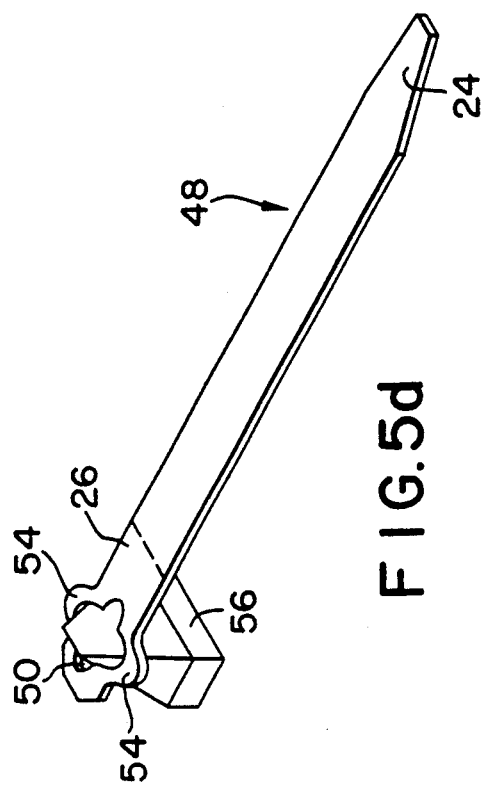
Figure 5A:
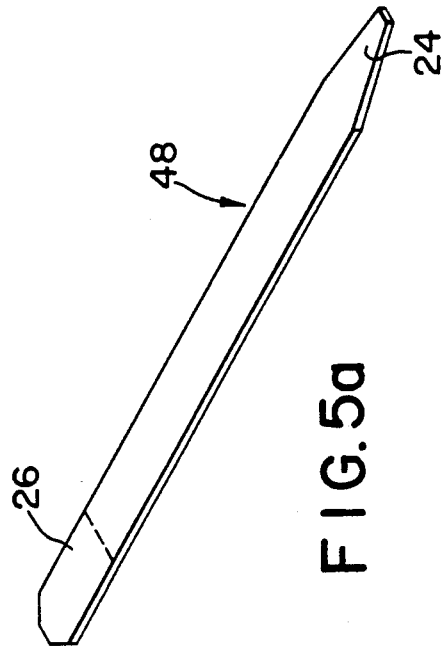

Within the finishing apparatus 46 the strips 42 are cut, stamped or otherwise formed, as is well known in the art, to a desired length, resulting in a band blank 48, as illustrated in FIGS. 4A and 5A. The band blank 48 can be further formed, as is well known in the art, to supply a taper at the free end 24. It is important to realize however, that tapering the free end 24 is not necessary for the band clamp 20 to properly operate, rather it is only to facilitate insertion of the free end 24 into the buckle slot 32.

Thereafter, a portion of the band is removed to form a void 50 in approximately the center of the buckle section 26. The void 50 can be formed by any number of methods well known in the art. In one embodiment of the present invention, the void 50 is die cut. Furthermore, the void 50 must be formed so as to allow the insertion of a stretching or deforming device. Once a stretching device is inserted into the void 50, sufficient pressure is asserted to deform the material adjacent the void 50 to create the slot 32.

Figure 4C:
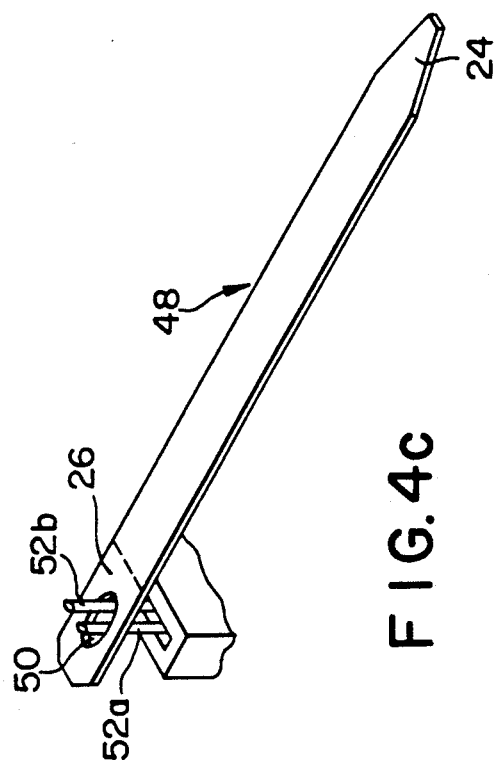

FIGS. 4C and 4D illustrate one method for forming the slot 32. FIG. 4C shows the insertion of pins 52a and 52b into approximately the center of the void 50. At insertion, the pins 52a and 52b are proximate each other. Once properly inserted, the pins 52a and 52b are separated, by any appropriate device known in the art, until the material adjacent the void 50 is sufficiently deformed into portions 54. The pins 52a and 52b are then removed.

Figure 5C:
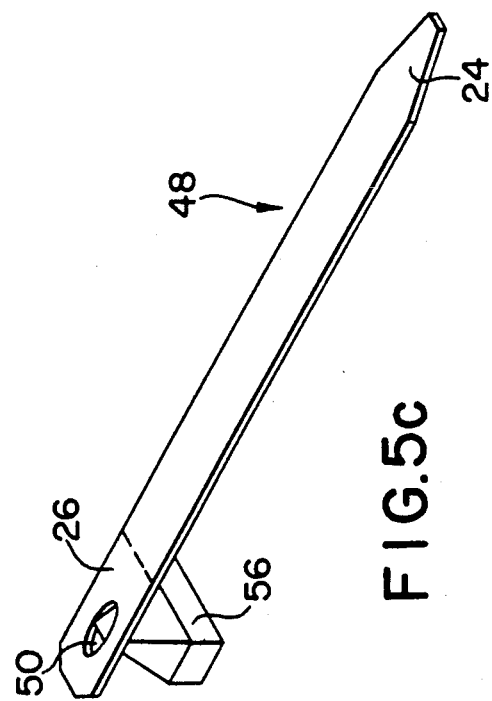

Another method for stretching is shown in FIGS. 5C and 5D. A wedge 56 is utilized to accomplish deformation of the material adjacent the void 50 into the portions 54. Specifically, the wedge 56 is inserted into approximately the center of the void 50. Once properly inserted, the wedge 56 is pressed further into the void 50, by any appropriate device known in the art, until the material adjacent the void 50 is sufficiently deformed into the portions 54. The wedge 56 is then removed. Utilizing either method for stretching, one skilled in the art should realize that the buckle section 26 of the band blank 48 could be positioned within a die prior to deformation thereof to ensure proper formation of the slot 32.

It may also be understood that it is unimportant whether the buckle section 26 is formed prior to or subsequent to cutting of the strips 42 into the band blanks 48. Moreover, as is well known in the art, the band blank 48 can be pressed in any appropriate manner, subsequent to the deformation process, to insure the band clamp 20 is generally planar in cross-section or is formed into an other desirable shape.

Although the present invention has been described with reference to particular embodiments, it should be appreciated that further embodiments can be provided within the spirit and scope of this invention as defined by the claims set forth herein.

What is claimed is:

1. A method for forming a band clamp comprising the steps of:
   providing a band with a first face, a second face that is separated from said first face by a defined distance so that said band has a substantially uniform thickness, a first end, a second end, a substantially uniform width, and a longitudinal axis extending between said first end and said second end;
   cutting a substantially longitudinally extending slit in said first end of said band, said slit having a first upper terminal point and a first lower terminal point;
   providing a wedge with a tip portion having a first circumference and a base portion having a second circumference that is greater than said first circumference;
   positioning said wedge so that said tip portion is adjacent to said slit and said base portion is spaced from said slit;
   substantially establishing the final shape of a slot for receiving the said second end of said band by displacing at least one of said wedge and said band toward the other so that said tip portion extends increasingly beyond said slit and until a substantially four-pointed star-shaped slot is formed, as a result of contact with said base portion of said wedge, that has a first slot portion with a first major axis which is substantially parallel to said longitudinal axis, a first length that extends from said first upper terminal point to said first lower terminal point and a first width and a second slot portion with a second major axis that is substantially perpendicular to said first major axis of said first slot portion, a second length that extends from a second right terminal point to a second left terminal point, and a second width, said second length and said second width being sufficient to receive said second end of said band, said first width being substantially less than said second length, and said first upper and lower terminal points and said second right and left terminal points defining the four points of said four-pointed star-shaped slot, said step of displacing substantially avoiding any rotation of said wedge about an axis that is normal to said first face and said second face at the location of said slot in the forming of said slot; and
   terminating said step of establishing the final shape of a slot for receiving said second end of said band once said substantially four-pointed star-shaped slot is formed.

2. A method, as claimed in claim 1, wherein:
said step of providing includes tapering a portion of said second end to facilitate subsequent engagement of said second end with said slot resulting from said step of displacing.

3. A method, as claimed in claim 1, wherein:
said step of providing includes slitting a sheet of banding material to form said band and at least one other band.

4. A method, as claimed in claim 1, wherein:
said step of providing includes slitting a sheet of banding material to form said band and at least one other band, and forming said band and said one other band to a desired length.

5. A method, as claimed in claim 1, wherein:
said step of cutting includes punching said band with a tool and die apparatus.

6. A method, as claimed in claim 1, wherein:
said step of displacing ceases before the width of said band in the area of said slot exceeds two times said substantially uniform width of said band.

7. A method, as claimed in claim 1, wherein:
said step of displacing includes linearly displacing at least one of said wedge and said band until said slot is formed.

8. A method, as claimed in claim 1, further comprising:
flattening said band in the area of said slot so that said band in the area of said slot has said substantially uniform thickness.

* * * * *